:# 3,773,808
METHOD OF PREPARING CYANOACETIC ACID ESTERS

Petrus Gerardus Johannes Wesselman, van Houtenlaan, Weesp, Netherlands, assignor to U.S. Philips Corporation, New York, N.Y.
No Drawing. Filed Oct. 22, 1969, Ser. No. 868,606
Claims priority, application Netherlands, Oct. 26, 1968, 6815349
Int. Cl. C07c *121/06*
U.S. Cl. 260—465.4  8 Claims

ABSTRACT OF THE DISCLOSURE

A method of preparing cyanoacetic acid esters by reacting halogenacetic acid esters with alkali cyanide in a reaction medium consisting of acetonitrile.

---

The invention relates to a method of preparing cyanoacetic acid esters from halogenacetic acid esters and alkali cyanide.

From Dutch patent application 6510405, it is known that cyanoacetic acid esters can be prepared from halogenacetic acid esters by means of alkali cyanides in the presence of hydrogen cyanide. In this process the alcohol corresponding to the alcoholic component of the ester is preferably used as the solvent. However, dimethyl formamide and dimethyl sulfoxide may also be used.

In this method, from 0.1 to 4 moles of hydrogen cyanide per mole of alkali cyanide must be used to suppress undesirable side reactions. Furthermore, at least equimolar amounts of halogen acetic acid ester and alkali cyanide, but preferably from 1.1 to 6 times larger amounts of halogen acetic acid ester, are used. Accordingly, in all the examples the number of moles of the ester is 1½ or 2 times greater than that of the moles of the ester.

Although by this method a high yield is obtained, calculated with respect to the halogen acetic acid cyanide converted, the amount of cyanoacetic acid ester prepared is small owing to the small percentage of halogen acetic acid ester converted. In order to effect a less incomplete conversion of the amount of acetic acid ester used, the reaction mixture must be recycled several times.

Other, less suitable, known methods of preparing cyanoacetic acid esters are discussed in the introductory part of the said Dutch patent application.

Surprisingly, it has now been found that cyanoacetic acid esters can be prepared in high yield by using acetonitrile as the solvent.

An important advantage of the method according to the invention is that complete conversion of the halogen acetic acid esters is effected so that there is no need for recycling. This is the more important as the separation of thermally instable halogen acetic acid esters such as, for example, halogen acetic acid tertiary butyl esters, from the reaction mixture at normal pressure is not possible and at reduced pressures is extremely difficult owing to the very small differences in boiling point between cyanoacetic and halogen acetic acid esters.

Another factor which contributes to the complete conversion of halogen acetic acid esters, is the use of an excess of alkali cyanide. This further has the advantage that the reaction is accelerated and, surprisingly gives less secondary products.

The use of acetonitrile also has the important advantage that this solvent has a low boiling point as compared to dimethyl sulfoxide, dimethyl formamide and the alcohols, except methanol, ethanol and propanol, which are used as solvents in the method according to the Dutch patent application referred to hereinbefore, and hence the solvent can readily be removed after the reaction.

Since in the method according to the invention no hydrogen cyanide is required, this method is appreciably safer and less expensive.

Further it is of importance that after the removal of the solvent by evaporation, without further processing, the product of the method can be marketed as technical-grade cyanoacetic acid ester.

Accordingly, the invention relates to a method of preparing cyanoacetic acid esters of the general formula NC—$CH_2$COOR from halogen acetic acid esters of the general formula Hal—$CH_2$COOR, where Hal is a chlorine or bromine atom and R is an alkyl, alkenyl, cycloalkyl, aralkyl or aryl group, and sodium or potassium cyanide, which method is characterized in that the reaction is carried out in acetonitrile with an excess of the cyanide.

The use of sodium cyanide is to be preferred to the use of potassium cyanide.

The cyanide may be used in an excess of up to 100%. A greater excess may be used, but this provides almost no additional advantage. Very good results are obtained by the use of an excess of from 25% to 50%.

The grain size of the cyanide influences the reaction velocity. Hence, preferably grains having a diameter of about 1 mm. or less, especially grains having a diameter of about ½ mm. or less, are used.

The presence of water in the reaction mixture is not necessary, but it is desirable. The amount may be about 0.75 mole per mole of halogen acetic acid ester.

The concentration of the halogen acetic acid ester may vary within comparatively wide limits. In general, concentrations between 0.5 and 3.5 mole/litre are used. A concentration of about 2 moles/litre is preferred.

The method may be performed at temperatures between room temperature and the boiling temperature of the reaction mixture, preferably between 40° C. and 60° C. Obviously, the reaction time depends on the temperature, and it is about 5 to 7 hours at temperatures of about 50° C.

The method according to the invention will be described more fully with reference to the following examples.

EXAMPLE 1

150.5 g. of chloroacetic acid tert. butyl ester (1 mole) 64 g. of NaCN of a purity of 95% and a grain size of at most 0.5 mm. (1.25 mole), 320 ml. of acetonitrile, 13 ml. of water (0.72 mole) were heated to 50° C. with vigorous stirring for 6 hours. The reaction mixture was then cooled to room temperature. The solid substance (NaCl and NaCN) was filtered off. This solid substance was subsequently washed thrice, each time with 500 ml. of acetonitrile.

The collected acetonitrile solutions were concentrated by means of a short distillation column at normal pressure to a maximum boiling temperature of 90° C. Subsequently, 5 g. of anhydrous potassium carbonate was added to the residue, the mixture then being distilled in a vacuum. After a small amount of first runnings, cyanoacetic acid tert. butyl ester distilled over at 58–63° C./0.2–0.3 mm. of mercury. The yield relative to chloroacetic acid tert. butyl ester was 80%.

EXAMPLE 2

The test described in Example 1 was repeated at 60° C. The reaction time was 5 hours and the yield of cyanoacetic acid tert. butyl ester was 78%.

EXAMPLE 3

The test described in Example 1 was repeated using 6.5 ml. of water and 54 g. of NaCN (1.05 mole). The reaction time was 6 hours and the yield of cyanoacetic acid tert. butyl ester was 77%.

EXAMPLE 4

The test described in Example 1 was repeated using 160 ml. of acetonitrile and 6.5 ml. of water at 80° C. The reaction time was 4 hours and the yield of cyanoacetic acid tert. butyl ester was 77%.

EXAMPLE 5

The test described in Example 1 was repeated using 102.5 g. of NaCN (2.00 mole) and 3.25 ml. of water at 80° C. The reaction time was 5 hours and the yield of cyanoacetic acid tert. butyl ester was 78%.

EXAMPLE 6

The test described in Example 1 was repeated using 122.5 g. chloroacetic acid ethyl ester (1.0 mole) and 640 ml. of acetonitrile. The yield of cyanoacetic acid ethyl ester was 77% (boiling point 68° C. at 1 mm. of mercury).

What is claimed is:

1. A method of preparing a cyanoacetic acid ester of the formula NC—CH$_2$COOR wherein R is a member consisting of alkyl, alkenyl, cycloalkyl, aralkyl and aryl, said method comprising reacting an excess amount of up to 100% of an alkali metal cyanide selected from the group consisting of sodium cyanide and potassium cyanide, said alkali metal cyanide being the sole cyanide employed and a halogen acetic acid ester of the formula Hal—CH$_2$COOR wherein Hal is a halogen selected from the group consisting of bromine and chlorine, at a temperature of between about room temperature and the boiling point of the reaction mixture in a reaction medium consisting essentially of acetonitrile.

2. The method of claim 1 wherein sodium cyanide is employed.
3. The method of claim 1 wherein an excess of from 25% to 50% of the cyanide is used.
4. The method of claim 1 wherein the cyanide has a grain size of up to about 1 mm.
5. The method of claim 4 wherein the cyanide has a grain size of up to about ½ mm.
6. The method of claim 1 wherein the reaction is carried out in the presence of water.
7. The method of claim 6 wherein the reaction is carried out in the presence of about 0.75 mole of water per mole of halogen acetic acid ester.
8. The method of claim 7 wherein cyanoacetic acid tertiary butyl ester is prepared.

References Cited

UNITED STATES PATENTS 3,384,654  5/1968  Sennewald et al. __ 260—465.4 X
3,360,540  12/1967  Sennewald et al. __ 260—465.4 X LEWIS GOTTS, Primary Examiner C. F. WARREN, Assistant Examiner U.S. Cl. X.R.

260—464, 465 D